US009503477B2

(12) United States Patent
May et al.

(10) Patent No.: US 9,503,477 B2
(45) Date of Patent: Nov. 22, 2016

(54) NETWORK POLICY ASSIGNMENT BASED ON USER REPUTATION SCORE

(71) Applicant: Fortinet, Inc., Sunnyvale, CA (US)

(72) Inventors: Robert A May, Vancouver (CA); Yixin Pan, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 251 days.

(21) Appl. No.: 14/228,182

(22) Filed: Mar. 27, 2014

(65) Prior Publication Data

US 2015/0281277 A1    Oct. 1, 2015

(51) Int. Cl.
*H04L 29/06*    (2006.01)

(52) U.S. Cl.
CPC .............. *H04L 63/20* (2013.01); *H04L 63/08* (2013.01); *H04L 63/10* (2013.01)

(58) Field of Classification Search
CPC ........ H04L 63/20; H04L 63/10; H04L 63/08
See application file for complete search history.

(56) References Cited

U.S. PATENT DOCUMENTS

| | | | | |
|---|---|---|---|---|
| 8,566,932 B1* | 10/2013 | Hotta | ...................... | G06F 11/00 726/2 |
| 2011/0185436 A1* | 7/2011 | Koulinitch | .......... | G06F 21/6218 726/28 |
| 2011/0280160 A1* | 11/2011 | Yang | ................... | H04L 65/1079 370/259 |
| 2012/0185910 A1* | 7/2012 | Miettinen | ............... | G06F 21/31 726/1 |
| 2012/0291087 A1* | 11/2012 | Agrawal | ................. | G06F 21/55 726/1 |
| 2013/0111547 A1* | 5/2013 | Kraemer | ............... | G06F 21/552 726/1 |
| 2013/0268994 A1* | 10/2013 | Cooper | ................... | H04L 63/10 726/1 |
| 2014/0075500 A1* | 3/2014 | B'Far | .................... | H04L 63/102 726/1 |
| 2015/0215319 A1* | 7/2015 | Koeten | ................... | H04L 63/10 726/1 |

* cited by examiner

*Primary Examiner* — Matthew Smithers
(74) *Attorney, Agent, or Firm* — Hamilton, DeSanctis & Cha LLP

(57) ABSTRACT

A network controller device, systems, and methods thereof are described herein for enabling a mechanism of assigning network policies to one or more users based on their respective client reputation (CR) scores. CR scores indicate a measure of the level and kind of network activity that an internal resource does with external resources. Based on the evaluation of the CR score for a given user, system of the present invention can be configured to implement an appropriate policy on the user that controls the manner in which the user interacts within and outside the network. Proposed system includes multiple virtual local area networks (VLANs), wherein each VLAN is configured with a defined policy such that once the CR score for a given user has been evaluated, the user can be put on an appropriate VLAN based on the evaluation and the intended policy that the system wants the user to follow.

18 Claims, 11 Drawing Sheets

400 ↘

| VLAN No. | Bandwidth | Filter Status | Security Policy |
|---|---|---|---|
| 26 | 150 | Inactive | Policy_1 |
| 38 | 100 | Inactive | Policy_2 |
| 41 | 80 | Active | Policy_3 |
| 112 | 10 | Active | Policy_4 |
| 145 | 8 | Active | Policy_5 |
| 178 | 5 | Active | Policy_6 |

| User Id | CR Score | VLAN Assigned |
|---|---|---|
| 23 | 78 | 26 |
| 51 | 97 | 112 |
| 19 | 64 | 41 |
| 4 | 97 | 112 |
| 88 | 56 | 38 |
| 105 | 78 | 26 |

Fig. 5

NETWORK POLICY ASSIGNMENT BASED ON USER REPUTATION SCORE

CROSS-REFERENCE TO RELATED APPLICATIONS

This application may relate to subject matter disclosed in co-pending U.S. patent application Ser. No. 13/476,171, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2014, Fortinet, Inc.

BACKGROUND

Field

Embodiments of the present invention generally relate to access of resources over a computer network. In particular, embodiments of the present invention relate to retrieval and evaluation of client reputation (CR) score of a user and assigning policies to the user for accessing network resources based on the CR score.

Description of the Related Art

In a network such as a computing network or a telecommunication network that is coupled to resources such as computers, laptops, mobiles, Personal Digital Assistants (PDAs), virtual server, virtual machines, widgets, among other computing devices, the resources are generally susceptible to hostile attacks arising as a result of malicious objects such as malware, web robots or BOTS, phishing, modified virus codes, and other viruses. Global networks, such as the Internet, when coupled with the ability of remote access, increase the vulnerability of corporate data, the risk of information leaks, the risk of unauthorized document access and the disclosure of confidential information, the risk of fraud, and also the risk of attacks on privacy. Such malicious objects may contaminate the resources and initiate risky activities in the network such as bad connection attempts, file sharing applications, session initiation for incoming connections, and so forth. Therefore, a resource contaminated with one or more malicious objects may be considered as a malicious resource for the network. At the time, it would also be appreciated that it is often the case that vulnerability of a resource depends on the actions that a user takes while communicating with external resources. For instance, the extent, manner, and mode of access to websites, portals, and applications that have high likelihood of causing threat to a resource is proportional to an actual attack that might take place on the resource.

Such malicious resources may further contaminate other resources that are operatively coupled with each other in the network. For instance, if a user, using a first computing device, is connected to other users over a local area network (LAN), the probability of computing devices of such other users being attacked by malware, virus codes, among others is likely to increase in case the first computing device is affected by such network level threats or attacks, and therefore detecting, evaluating, and appropriately handling the first computing device becomes a top priority.

Employees are among the greatest threats to an organization's information security and also significantly responsible for network level threats that an organization faces for its resources. Employees, with access to information resources including email, the Internet, and on-line networks, significantly increase the security risks, making it extremely important to proactively monitor the kind of data that employees share through multiple messaging platforms or try to access or receive from external networks, and accordingly take necessary measures to prevent any potential misuse of information or exposure of internal resources to the outside networks.

Setting appropriate, flexible, and robust security policies is a recommended method for creating order and for setting standards for network use. However, most existing techniques for setting security policies are not individual user based and largely apply the policies to the entire organization at large. Such techniques also do not take into account each user's network access behavior and rather take departments or groups of employees as a whole and implement network access policies on them based on the organizational requirements. Such policies, as a result, do not evaluate the condition of each internal resource/computing device, its pattern of network access, files accessed, network activity, external resource violations, and its vulnerability to network attacks, among other parameters for setting network access policies and hence are loosely implemented.

In view of the foregoing, there is therefore a need for new and more effective techniques for assigning appropriate network policies to users based on their reputation scores, which is computed based on network level activities and activities/interactions of the users.

SUMMARY

A network controller device, systems, and methods thereof are described herein for enabling a mechanism of assigning network policies to one or more users based on their respective client reputation (CR) scores. CR scores, also interchangeably referred to as reputation scores hereinafter, indicate a quantitative and/or qualitative measure of level of network activity that a resource, say an internal resource, does with external resources. Such activity can relate to requests that internal resource sends out to network (traffic generated), requests that the resource receives (traffic received), types of events (such as blocked connections, virus transmissions, connections to undesired sites, websites visited, invalid DNS queries, among other like events) that the resource participates in, among other like activities, and attributes thereof. Based on evaluation of CR score for a given user, system of the present invention can be configured to implement an appropriate policy on the user, which controls the manner in which the user interacts within and outside the network. According to one embodiment, the proposed system comprises multiple virtual local area networks (VLANs), wherein each VLAN is configured with a defined policy such that once the CR score for a given user has been evaluated, the user can be assigned to an appropriate VLAN based on the evaluation and the intended policy that the system wants the user to follow. According to one embodiment, network controller device of the present invention comprises a reputation score retrieval module, a reputation score evaluation module, and a policy assignment module.

According to one embodiment, reputation score retrieval module is configured to retrieve client reputation (CR) score associated with a given user, wherein the client reputation (CR) score can be generated based on one or more of network level activities, interactions of users, user profiles, all or part of which can be stored in a client reputation database (CRDB) that is operatively coupled with the network controller device. It would be appreciated that although the present embodiments have been described with respect to functional modules of the proposed system being implemented in network controller device, any of the modules or parts therefore can be implemented in any other device or processing means to enable implementation of network policies.

According to one embodiment, reputation score evaluation module is configured to evaluate retrieved CR score of the user. In an implementation, evaluation of the CR score can include comparison of the score with one or more threshold values to assess the level of network activity of the user and potential threat that the user poses and/or has. According to another embodiment, policy assignment module is configured to assign a policy from a policy database to a user based on evaluation of CR score of the user in context, wherein the policy governs the manner in which the user can access the network via one or more interface mechanisms. In an instance, one policy can be configured to block, rate limit, or impose one or more network access restrictions on a first user, whereas another policy can be configured to allow all web-level requests from a second user to be processed. In an implementation, network controller retrieves and evaluates client reputation (CR) score of each user attempting to connect to the network and assigns one or more policies to the user based on respective client reputation (CR) score.

According to one embodiment, client reputation (CR) score can be retrieved and evaluated for each user at the beginning of a session and based on the evaluation, network policies can be assigned at the beginning of the session itself. CR scores can also be updated/modified periodically based on user behavior, profile, interactions, preferences, among other like parameters, based on which policies assigned earlier can be replaced with more appropriate policies. In an exemplary embodiment, a gateway device may be utilized as a network controller, in which scenario, the gateway device can be capable of authenticating user, retrieving and evaluating client reputation score, and assigning policies based on the CR score to define the manner in which the network can be accessed.

Various embodiments of the invention may be enabled by using a graphical user interface (GUI), which can include menus and sub-menus for providing access to a network controller and represent information corresponding to retrieval and/or evaluation of CR score of a user for assignment of network policies to the user based on evaluated CR score. GUI can be configured to facilitate display the CR score and applicable policies assigned to one or more users. In addition, GUI may enable a user to customize policies based on retrieved and evaluated client reputation score.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

Embodiments of the present disclosure are illustrated by way of examples, and not by the way of any limitation, in the figures of the accompanying drawings and in which like reference numerals refer to similar elements and in which:

FIG. 4 is an exemplary table illustrating policies and settings defined for VLANs for allowing network access in accordance with an embodiment of the present invention.

FIG. 5 illustrates an exemplary table showing user identification along with corresponding CR score and VLAN that is assigned to respective user in accordance with an embodiment of the present invention.

DETAILED DESCRIPTION

Figure 1:
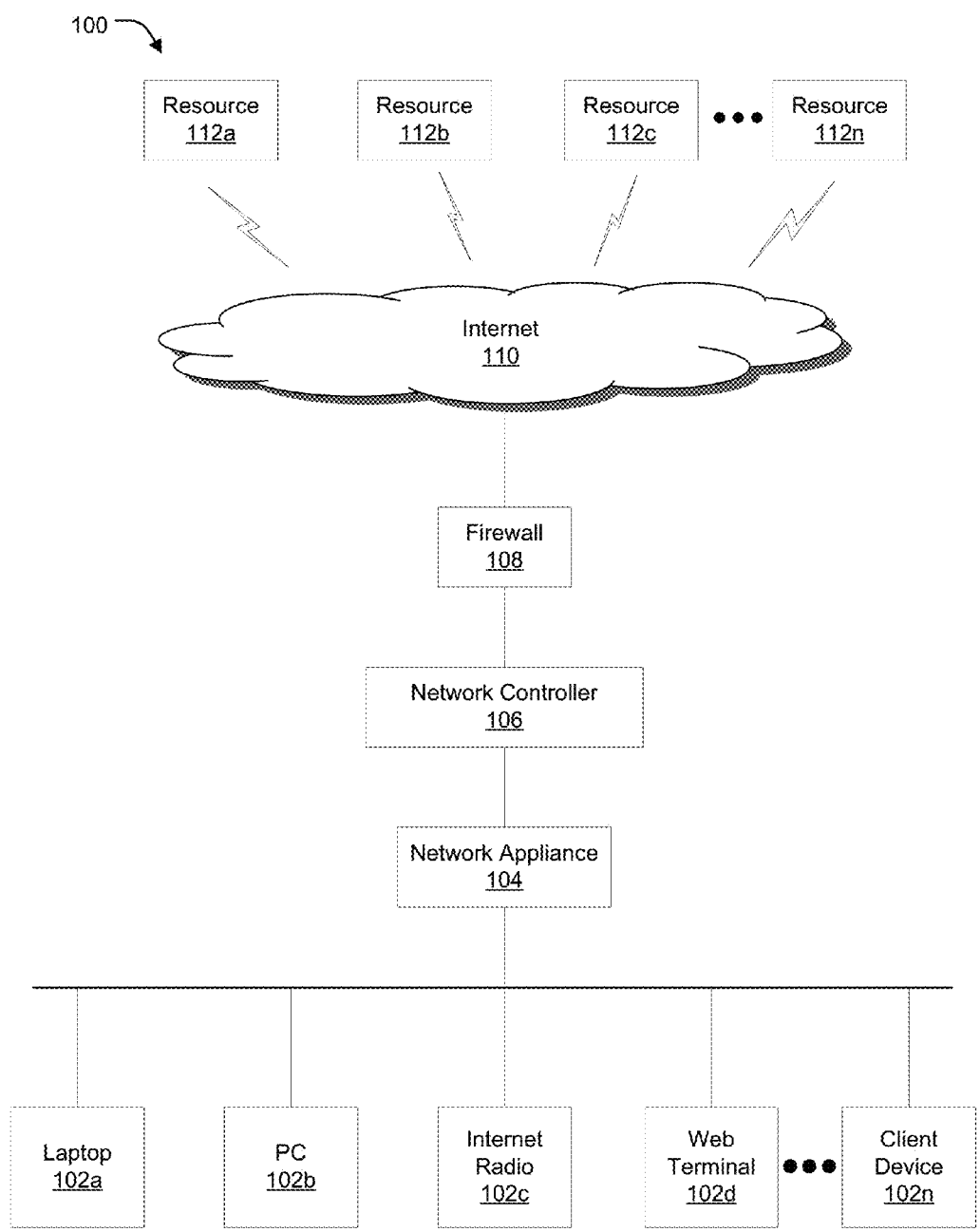
FIG. 1 illustrates an exemplary network architecture in accordance with an embodiment of the present invention.

Systems and methods are described for evaluating network level interactions of one or more users to compute their client reputation (CR) scores, and using the CR scores to assign appropriate network policies to the users for defining the manner of network access.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/ machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the present disclosure could be accomplished by modules, routines, subroutines, or subparts of a computer program product.

Notably, while embodiments of the present invention may be described using modular programming terminology, the code implementing various embodiments of the present invention are not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARMO, ColdFire®, GPU, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of effecting data transactions between applications of devices that are configured in a single host, it should be appreciated that the proposed architecture can also be implemented in devices that are configured on different/closely-integrated hosts/systems, and that the single host embodiment has been explained merely to illustrate the invention in an exemplary manner and any other purpose or function for which the explained structure or configuration can be used, is covered within the scope o the present disclosure.

TERMINOLOGY

Brief definitions of terms used throughout this application are given below.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as a File Transfer Protocol (FTP) client.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The term "malicious resource" generally refers to an application program, process or device that includes a malicious object, such as malware, web robot or BOT, phishing, modified virus code and/or other viruses. These malicious objects enable risky activities or policy violations by the malicious resources. The malware or risky activity includes, but is not limited to, program and non-program content, such as computer worms and infected web pages, transmitted to the client terminals through the network, for example, through public or private internet. The policy violation may include, but are not limited to, violation of criteria assigned by the network gateway/administrator. Other examples of risky activities may include bad connection attempts by the resource, accessing information from restricted sites, such as some foreign sites, adult sites, etc., by the resource.

If the specification states a component or feature "may", "can", "could", or "might" be included or have a characteristic, that particular component or feature is not required to be included or have the characteristic.

The phrase "network gateway" generally refers to an inter-networking system that enables entrance to a network. A "network gateway" can be implemented completely in software, completely in hardware, or as a combination of the two. Depending on the particular implementation, network gateways can operate at any level of the Open Systems Interconnection (OSI) model from application protocols to low-level signaling.

The term "reputation" generally refers to evaluation of a resource based on consolidated score corresponding to the resource. The reputation indicates behavior of a resource in relation to malware activities, network level activities, requests sent and received, interactions with external resources, among other attributes.

The term "resource" generally refers to an application, program, process or device that processes information and/or provides services of one or more client devices. Resources may also be sometimes interchangeably referred to as user client devices, and therefore are not limited to aforementioned definition.

The term "request" refers to communication message sent from one resource to another resource.

The term "score" generally refers to the rating given to each resource. The score helps in determining whether the resource is malicious or not. The score indicates compliance of a resource with policies. Each malware activity is assigned a base score and this score contributes to the resource's historical or past score whenever the resource undertakes a risky activity. A low score' is indicative of high malware activity by the resource or the client and a 'high score' is indicative of low malware activity by the resource or the client. Alternatively a high score could indicate increased malware activity depending on the model adopted, either counting down from an agreed baseline, or counting up to a maximum threshold.

The term "server" generally refers to an application, program, process or device in a client/server relationship that responds to requests for information or services by another program, process or device (a server) on a network. The term "server" also encompasses software that makes the act of serving information or providing services possible.

The term "network security policy", also interchangeably referred to as "network policy" or simply "policy" hereinafter, refers to a document that outlines rules for computer network access, determines how policies are enforced, how multi-faceted protection is achieved, and lays out some of the basic network architecture of the company security/network security environment. Such architecture can include configuration of security products, site security, administrative procedures, end-user responsibility, network vulnerability scanners, and more.

While embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

FIG. 1 illustrates an exemplary network architecture 100 in accordance with an embodiment of the present invention. Architecture 100 can include one or more client devices such as Laptop 102a, PC 102b, Internet radio 102c, web terminal 102d, client device 102n, among other like computing devices such as tablet PCs, mobile phones, smart phones, printers, television, virtual machine, and office work station, collectively referred to as client devices 102 hereinafter, which are operatively coupled with a number of resources such as resource 112a, resource 112b, resource 112c, . . . , resource 112n, collectively referred to as resources 112 hereinafter, through Internet 110. In an embodiment, client devices 102, or groups therein, can be thought of as being a part of a network such as a Local Area Network (LAN), a Wide Area Network (WAN), a Metropolitan Area Network (MAP), and the like, which can be operatively coupled with Internet 110 by means of a network appliance 104, such as access point (AP) switch, router, hub, gateway device, firewall, among other such networking devices, or combinations thereof, that enable access to Internet 110.

According to one embodiment, network appliance 104 separates external computing environment, represented by Internet 110, from internal computing environment represented by client devices 102. Network appliance 104 can be configured to detect and distinguish between a valid and invalid incoming packet from Internet 110, wherein security rules defined by appliance 104 help can scan and evaluate each incoming and outgoing packet in order to determine whether the packet should be allowed to pass through, or blocked, or any other desired action should to be taken to handle the packet. According to one embodiment, appliance 104 can be operatively coupled with, or can incorporate, a security rules database (not shown) that comprises all rules and settings that are needed to process and scan a packet for determination of an appropriate action thereon.

Resources 112 can be configured to perform various activities such as communication with various client devices 102 over an appropriate network such as Internet 110 by exchanging/processing requests such as for file transfer, running an application, data processing, loading of web pages, storing content, establishing connection, and the like. For efficient communication between client devices 102 and resources 112, it is important to prevent unauthorized and/or undesired access to or interaction between client devices 102 and resources 112. For instance, based on a company's requirements, it is important to prevent devices 102 from requesting content to undesired resources that violate company policies. At the same time, it is also important to prevent connection requests from and/or transmission of content from unauthorized resources 112.

According to one embodiment, network appliance 104 is operatively coupled with a network controller 106, wherein the controller 106 is configured to monitor network level interactions that take place between client devices 102 and resources 112 in order to assess type requests being made in both incoming and outgoing directions, type of requests being allowed by network appliance 104, type of applications being used/downloaded/uploaded, user level activity of each user, group level activity of each group/department of users, monitor changes in user profile, bandwidth being consumed, among other assessment attributes that help controller 106 determine one or a combination of level of compliance of each user with respect to defined corporate network usage policies, actions leading to non-compliance, usage pattern, based on which the controller 106 can then assign policies to each user based on his/her network level interactions or any other factor that impacts user's network usage.

In an embodiment, controller 106 can also be thought of as a network auditor that is configured to monitor, assess, and quantify performance of configurations, users, entities, stakeholders, external resources, existing policies, security settings, and access control mechanisms, among other aspects of network appliances 106. As network appliances 104 can include network security systems, network controller 106 can also use network auditing programs as a mechanism of checking compliance of network appliance 106 and users of internal network, with established routing and traffic policies, identify compliance with a set of expected standards for management and information security of networks connected to backbone, monitor and provide an overall review of consistency, quality, and reliability of network management processes related to the network appliance, examine and analyze the volume, type, or quality of traffic flowing through the network appliance, among other such objectives.

In an implementation, network controller 106 can also be configured as part of network appliance 104 or can be configured separately as shown in the representation of FIG. 1, wherein, in an implementation, network appliance 104 is used for deciding packets that should be allowed and/or disallowed from being exchanged between client devices 102 and resources 112, wherein controller 106 is used for analyzing network usage/interaction trends/patterns of multiple users, and computing a client reputation (CR) score for each user based on his/her network usage/interaction with reference to compliance/expected behavior, and assigning policies based on the CR score. Controller 106 may be implemented as hardware, software, firmware or a combination of these and may be located outside of network of computing devices or can be configured within the network. Although the exemplary representation of FIG. 1 has been explained with reference to network appliance 104 being operatively coupled with network controller 106, any other structural/constructional change in configuration is completely within the scope of the present invention. For instance, both, the controller 106 and the appliance 104 can be implemented in a network gateway, a network interface card (NIC), a router, an Ethernet, a software module, a hub, a virtual machine, a widget, or any other application/device.

Architecture 100 can further include a firewall 108 between network controller 106 and Internet 110, where firewall 108 acts as a network security or access control mechanism and is configured to shield data and resources from computer network intruders in order to create an electronic boundary that prevents unauthorized users from accessing files or other content on a network or a computing device. In an implementation, as mentioned above, controller 106 and/or appliance 104 can be integrated with firewall 108 to form a single device or a group of network control devices.

Figure 2:
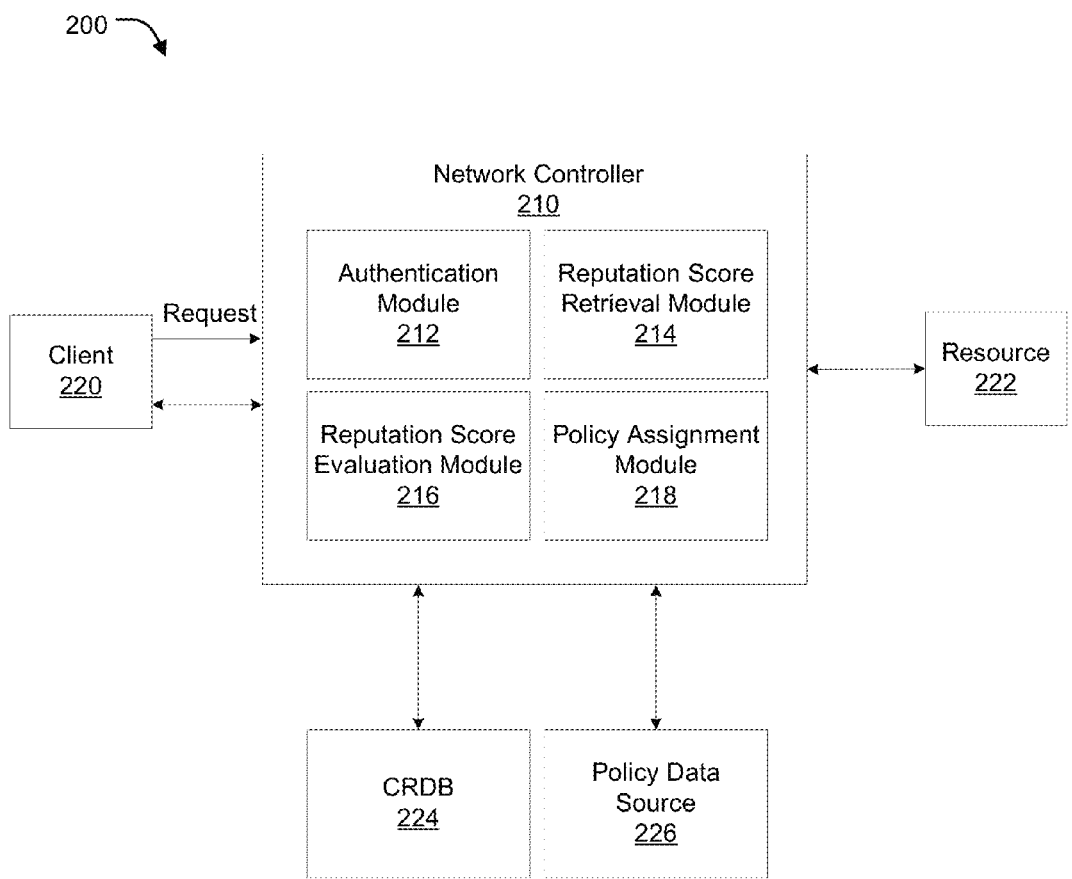
FIG. 2 illustrates exemplary functional units of a network controller in accordance with an embodiment of the present invention.

FIG. 2 illustrates exemplary functional units 200 of a network controller 210 in accordance with an embodiment of the present invention. As mentioned above in FIG. 1, network controller 210 is configured to monitor network level interactions that take place between client devices and external resources in order to assess type requests being made in both incoming and outgoing directions, type of requests being allowed by network appliance, type of applications being used/downloaded/uploaded, bandwidth being consumed, user level activity of each user, group level activity of each group/department of users, monitor changes in user profile, among other assessment attributes that help the controller determine one or a combination of, level of compliance of each user with respect to defined corporate network usage policies, actions leading to non-compliance, usage pattern, based on which the controller 210 can then assign policies to each user based on his/her network level interactions or any other factor that impacts user's network usage.

According to one embodiment, network controller 210 can include an authentication module 212, a reputation score retrieval module 214, a reputation score evaluation module 216, and a policy assignment module 218. Controller 210 can monitor varied requests made by clients 220 to access content/information from resources 222, or incoming requests/information from resources 222 to client 220 in order to listen to and assess type of requests, required applications, geography of client 220/resource 222, session event, application event, interaction with various websites, and so forth.

Authentication module 212 is configured to validate authenticity of a user, which, in an implementation, can be performed prior to assignment of a network policy to the user. In an implementation, such an authentication can be done through known mechanisms incorporating one or a combination of Remote Authentication Dial-In User Service (RADIUS) server, Lightweight Directory Access Protocol (LDAP) server, Active Directory, Novell E-directory, Safeword, Secure ID, Security Assertion Markup Language 2.0 (SAML2), Terminal Access Controller Access-Control System (TACACS+), or local authentication.

In an instance, authentication module 212 can also be operatively coupled with an authentication server (not shown), which may authenticate a client 220, such as a DHCP client terminal device 220, based on existing RADIUS authentication. In such a case, a user can initiate a Point-to-Point Protocol (PPP) credential validation request to authentication server such as network access server (NAS), wherein NAS prompts for username and password (if Password Authentication Protocol [PAP]) or issues a challenge (if Challenge Handshake Authentication Protocol [CHAP]), to which the user can reply. A RADIUS client can then send username and encrypted password to the RADIUS server, which responds with Accept, Reject, or Challenge. RADIUS client can then act upon services and service parameters bundled with Accept or Reject.

In an embodiment, a user can be assigned an initial network policy based on one or a combination of authentication mechanism used, policies that form part of authentication mechanism used, level of authentication required, user profile (including department to which user relates to, designation, previous background activities, among other like attributes), among other like factors. In an exemplary implementation, controller 210 can be operatively coupled with a plurality of Virtual Local Area Networks (VLANs), each VLAN implementing or working based on one or more network policies. Controller 210 can therefore assign an initial network policy to a user by means of allocating the user to a given VLAN such that all incoming and outgoing requests pertaining to the user are routed through the assigned VLAN. In one implementation, each VLAN can be associated with a fixed network policy, whereas, in another implementation, a given VLAN can be associated with a group of policies, each of which can be enabled/activated based on time of access, mode of access, content being accessed, type of request, bandwidth desired, among other like parameters.

According to one embodiment, reputation score retrieval module 214 can be configured to retrieve client reputation (CR) score associated with a given user, wherein the client reputation (CR) score can be generated based on one or more of network level activities, interactions of users, user profiles, all or part of which can be stored in a client reputation database (CRDB) 224, which can be directly or indirectly coupled with network controller 210. Such a database 224, for instance, can form part of a remote memory/device. In an embodiment, CR score can be generated based on level of compliance that a user has with established practices and polices of the Company or group to which he/she belongs. Network level activities can include, but are not limited to, geography of resources to which user requests data, type of requests, content pertaining to the requests, bandwidth that such requests take, sessions of which the user forms part, time of request, among other like attributes. In an implementation, higher the CR score, the more non-compliant the user is to management policies or organization level standards. For instance, a user that has 60% of his requests pertaining to malicious content would have much higher CR score when compared with a user that has 20% of his requests for such content. Similarly, a user that requests for organization level data but consumes 50% more bandwidth while doing so would have higher CR score when compared with someone who might take more time to access/retrieve the same data but only consumes 20% of the bandwidth at any given time. One should appreciate that higher CR score for a more non-compliant user is merely an exemplary implementation, and any other form of scoring/grading/ranking can always be formed and is within the scope of the present invention. For instance, a higher CR score can also be assigned to users with higher compliance to organizational requirements.

In another implementation, each attribute such as bandwidth, type of content, type of request, applications used, time of request, among others can be weighted based on its relevance to the organization in context, and then processed with values for each of them for a given user to compute CR score for the user. For instance, factors such as bandwidth consumed and type of content/request may have higher weights such as 0.7 on a scale of 0-1, when compared with factors such as time of request, website accessed, which can have relatively lower weights such as 0.3. Once such weights have been associated to a defined list of attributes, they can, in an instance, be multiplied with the value of such attributes for a given user, to achieve CR score for the user. For instance, score for 'bandwidth' attribute for a user A can be 0.7*30, wherein 30 can denote, on a scale of 0-100, the bandwidth consumed by the user A. Similarly, a user B that consumes more than allocated bandwidth can have a value of say 130, which can give an even higher score for the bandwidth attribute for the user B (0.7*130). Such scores can then be summed for all the attributes for each user to arrive at the final CR score for the user. Such scores can be objective, wherein if, at a later stage, users qualifying a defined set of criteria need to be retrieved, the same can be done by extracting relevant users using a simple database query. For instance, such a query can state "Identify users having daily bandwidth usage value between 45 and 60 points, and having number of malicious requests between 15-18 per day".

In an embodiment, the current computed CR score can be aggregated with past scores of the respective user/client, wherein the overall score can be represented in one or a combination of numeric, alphabets, symbols, and alphanumeric, among others. Based on the aggregated score, the reputation of the user is identified, wherein the reputation may be such as, but not limited to, good, bad, safe, harmless, vulnerable, harmful, moderate, so forth. Reputation can indicate whether a resource is malicious or safe. In another implementation, the CR score can also be computed manually by, say, a network administrator, based on logs of user's network interactions. Such logs can also be stored in a client reputation database (CRDB) 224 along with user's profile information and respective CR scores. In addition, CRDB 224 can also be configured to store details such as IP address of client device, Media Access Control (MAC) address, device type, authentication details, geographical location, department and role/responsibility information, previous network and organizational history of each user.

CR scores can be regularly updated, either in real-time or periodically at defined time intervals. For instance, controller 210 can, for each 1 MB consumption of data, increase the CR score by 1 point, and for using 50% of allocated bandwidth for three consecutive days, decrease the CR score by 7 points (assuming lower CR score is preferred). Change in user profile, roles and responsibilities, location, designation, among other like parameters, can also lead to dynamic change in CR points for a user. According to one embodiment, client reputation (CR) score can be retrieved and evaluated for each user at the beginning of a session and based on the evaluation, network policies can be assigned at the beginning of the session itself. CR scores can also be updated/modified periodically based on user behavior, profile, interactions, preferences, among other like parameters, based on which policies assigned earlier can be replaced with more appropriate policies.

According to one embodiment, reputation score evaluation module 216 is configured to evaluate a retrieved CR score of a user. In an implementation, evaluation of the CR score can include comparison of the score with one or more threshold values to assess the level of network activity of the user and potential threat that the user poses and/or has. In an implementation, each user can be evaluated based on one or a combination of user's CR score, historical data pertaining to the CR score, the user profile, among other like attributes in order to grade a user in accordance with the kind of rights, allowances, and privileges that should be accorded to the user. Such rights can, for instance, be issued to govern the user's access to enterprise resources, external resources and other content.

In one embodiment, grades determined for each user based on reputation score can be categorized by depicting the user's network usage pattern and behavior, and therefore indicate his commitment, focus areas, and preferences. For instance, a reputation score of 1-20 can be categorized under grade A, 21-40 can correspond to grade B, 41-60 can correspond to grade C, and so on. Grade A, in such a case, can have an upper threshold of a CR score of 20, and therefore sooner the reputation score of a user becomes 21, he is upgraded to grade B. Even within each grade, sub-grades such as C1, C2, C3 can be incorporated to further categorize users within a defined grade. Other grade patterns such as A2-C4-B8 can also be associated with a given user for say 3 attributes, wherein for the first attribute, the grade is A2, for the second attribute the grade is C4, and for the third attribute the grade is B8.

Those skilled in the art will appreciate that instead of grading, any other measure that can be incorporated to evaluate CR scores of users and categorize and/or group them based on one or more categories/benchmarks. Apart from retrieved CR scores, as mentioned above, many other parameters such as user profile, time since the user joined the organization, designation, among others can also be play a role in categorization of a user. For instance, a user with a higher designation and/or more time with the organization and a given CR score can be categorized in a lower risk category when compared with a user with a lower designation and/or less time with the organization having the same CR score, or vice versa.

According to another embodiment, policy assignment module 218 can be configured to assign a policy from a policy database 226 to a user based on evaluation of CR score of the user in context and grade associated thereto, wherein the policy governs the manner in which the user can access the network via one or more interface mechanisms. In an instance, one policy can be configured to block, rate limit, or impose one or more network access restrictions on a first user, whereas another policy can be configured to allow all web-level requests from a second user to be processed. In an implementation, network controller 210 retrieves and evaluates client reputation (CR) score of each user attempting to connect to the network, and assigns one or more policies to the user based on respective client reputation (CR) score.

In an implementation, apart from or in addition to the user's CR score, policy can also be assigned based on a grade associated with the user, wherein the grade is assigned based on module 216. Such a grade may not only be assigned to a user based on the CR score, but also based on other user level attributes as mentioned above. Furthermore, based on a change in grade and/or CR score, policy can also be dynamically updated so as to control access rights and privileges based on network level interactions and activities of the user. In an instance, a user with a higher grade such as D2 may have more restrictions being imposed thereon by means of an appropriate policy allocation, due to higher level of undesired network activity, when compared with a user having a lower grade such as A4.

According to one embodiment, controller 210 can be operatively coupled with a plurality of Virtual Local Area Networks (VLANs), wherein each VLAN defines a different set of network usage policies by means of one or more policies. Each policy in the set of policies associated with a given VLAN can be used differently by respective VLANs, wherein, for instance, one VLAN can use policies depending on the time of request or based on the user in context or website being accessed, and another can use policies based on geography to which or from which the request is being issued, among other parameters. Module 218 can therefore be configured to assign each user to a defined VLAN based on his/her grade and/or CR score. As each VLAN practices a different policy, depending on the kind of restrictions that an organization wants to impose on a given user, a VLAN can be assigned accordingly. Such VLAN assignment can also be modified dynamically or at periodic intervals based on change in grade and/or CR score of the user in context. For instance, based on preferred behavior of a user after a blocking restriction is imposed thereon through say VLAN 5, after a defined interval of time, the blocking restriction can be replaced by partial restriction imposed by say VLAN 10 that enables the user to access a given website or type of content from 6 PM to 8 PM.

According to one embodiment, each policy of a given VLAN can also itself be amended and modified if desired. Such modification can be performed so as to not conflict with policies defined by other VLAN's, and therefore network administrator can amend the policy after careful consideration of the rights and restrictions imposed by other VLAN's. An appropriate graphical user interface (GUI) can be provided on network controller 210 such that any potential conflicts in policies can be automatically detected and put across to the administrator for corrective actions. As each network policy can typically be implemented by means of a set of filters associated with a variety of network actions, such filters can be checked/unchecked to activate access or deny access of different functionalities such as to control bandwidth, type of access, type of content (by entering malicious or undesired keywords in a list based on which requests having such keywords can be removed and denied), time of access, mode of access, among other preferences/settings.

GUI of controller 210 can also be enable manual allocation of VLAN's to users based on their grades and/or CR scores. For instance, users with CR score of 1-15 can be allocated VLAN 1 implementing policy 1, users with CR score of 15-30 can be allocated VLAN 2 implementing policy 2, and so on. As grading of users can be dependent on parameters additional to the CR score, grading can also be incorporated while allocating VLANs. User can also be monitored for a defined period of, say a week or a month, post which their network activity/behavior can be measured in view of the policy implemented or VLAN assigned, and re-assessment of the user can be done based on the number of violations, number of compliances, quantitative measures of requests/frequency of requests/network interaction pattern, number of incoming vs. outgoing requests, bandwidth consumed, access pattern based on time/date/day, among other factors.

In an implementation, network policies can be defined in each VLAN based on an access control lists (ACLs), wherein the ACLs can be added to the VLANs or ports associated with the various endpoint devices. The ACLs may require all traffic from an endpoint to be redirected to the security device, wherein the security device instructs the endpoint that it needs to be tested. For instance, security device such as network appliance 104 or firewall 108 of FIG. 1 might seize control of any web sessions and present a web page instructing endpoint user that endpoint needs to be tested. Once the endpoint has been tested successfully (i.e., the endpoint complies with the security policy), security device creates a dynamic ACL that permits the compliant endpoint to send outbound traffic to the network. ACLs can therefore enable a VLAN to take one or more desired actions such as redirect the request, forward the request, permit traffic, block the traffic, rate limit the traffic, allow partial traffic, among other actions. In an alternate embodiment, instead of only a user, a group of users can also be assigned a VLAN collectively based on their respective and group level CR scores and allocated grades.

According to another embodiment, a given VLAN can also be operatively coupled with one or more authentication servers such as RADIUS server, the LDAP server, and DHCP server such that sooner any of the servers authenticate a user, an appropriate VLAN can be assigned based on one or a combination of user profile, authentication information, CR profile, and grade/category allocated to the user in context.

Figure 3:
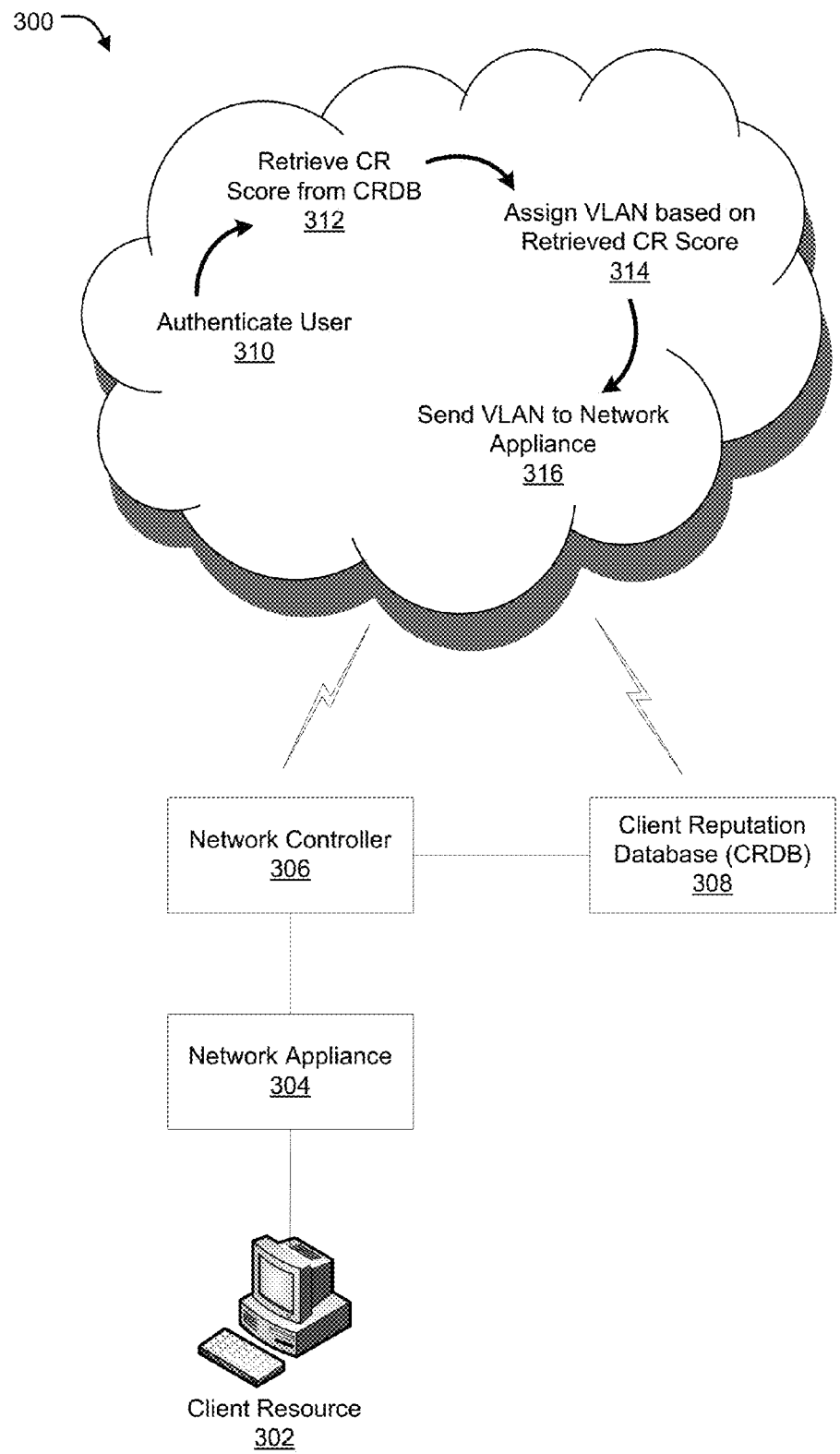
FIG. 3 illustrates an exemplary network architecture showing functions of a network controller in accordance with an embodiment of the present invention.

FIG. 3 illustrates an exemplary network architecture 300 showing functions of a network controller 306 in accordance with an embodiment of the present invention. As shown, a client 302, also referred to as a resource 302 in the present disclosure, can be operatively coupled with network controller 306 so as to issue a request for content/website/application through a network appliance such as access point 304. Controller 306 can, in turn, be operatively coupled with a client reputation database (CRDB) 308 that stores CR scores for one or more users along with other information such as user profile, designation, work responsibilities and roles, past history, change in pattern of CR scores, category/grade, among other like information. Controller 306, can, based on CR score and/or grade allocated to a user, assign a defined network security policy, which controls the kind of requests that the user is allowed, mode of requests that can be made, extent of bandwidth that can be utilized, among other details.

In an implementation, once a user logs into his/her client device 302, the first step in order to access a network level resource/website/application can be to get authenticated, which is shown as step 310, in which the user, by means of one or more exemplary authentication servers described above and also described later with respect to FIG. 7, obtains authorization to access one or more desired network level resources. Upon authorization, controller 306 can, at step 312, by means of CRDB 308, retrieve a CR score of the user to which a policy is to be assigned. Meanwhile, such CR score is retrieved and/or processed, a default policy can be assigned (by authentication server(s)) to the user based on authentication details.

Along with retrieving CR score, grade that the user is allocated based on his/her profile, past network interaction/access history, designation, among other parameters, can also be extracted from CRDB 308 or any other appropriate database/repository, and processed for assessing the kind of policy that should be assigned to the user. In case an appropriate policy does not already exist, a new policy can also be created, or an existing policy can also be customized to define a desired policy for the user. Such policy can either be directly associated with the user of client device 302, or can be first associated with a VLAN and then with the user 302 by making the user a part of the VLAN at step 314, at which time, all requests from the user 302 would pass through the VLAN. At step 316, information of VLAN that is assigned to the user 302, can be sent back to network appliance 304 so that all network requests thereafter from/to the user 302 can be routed through the assigned VLAN. Any change in assignment of VLAN subsequent to first time assignment can be automatically/manually updated to appliance 304 along with also being updated in CRDB 308.

FIG. 4 is an exemplary table 400 illustrating VLANs being associated with network security policies, and settings defined for VLAN for allowing network access in accordance with an embodiment of the present invention. As shown, each VLAN can be associated with its details such as bandwidth that its policy allows, configuration of filters that define network policy for the respective VLAN, along with giving identifier and details of security policy that the VLAN is associated with. For instance, for VLAN having identifier 26, the allocated bandwidth is 150 MB (maximum across all VLANs that a controller is connected with), filter status is inactive (indicating that no filters have been defined for the given VLAN), and policy identifier is Policy_1. As the allocated bandwidth is 150 MB, only the most preferred users can be assigned such a VLAN, which gives the respective users maximum relative flexibility to access websites, download/run applications, or execute other network level interactions. Similarly, VLAN having identifier 178 gives least bandwidth of say 5 MB and also may have maximum restriction filters activated.

In an embodiment, each security policy identifier presented within a Graphical User Interface (GUI) of network controller, for example, can be associated with a hyperlink and can be clicked to get further details of the policy. For instance, Policy_4 can be clicked to view filters that have been activated for restricting/allowing access to websites, type of files that can be downloaded, rate limitation imposed, time limitation imposed, number of users having same policy, grade(s) that the policy is associated with, keywords that the policy limits, actions that can be taken on users who violate the policy, among other details. Such details and parameters of the policy can always be modified/amended by administrator of controller.

FIG. 5 illustrates an exemplary table 500 showing user identification along with corresponding CR score and VLAN that has been assigned to each user in accordance with an embodiment of the present invention. As shown, a user having identifier 23 has been assigned a VLAN having identifier 26 and has a CR score of 78, and a user having identifier 4 has been assigned VLAN having identifier 112 and has a CR score of 97. In an instance, a higher CR score indicates more restrictive policies being implemented on the user and therefore, in view of FIG. 4, VLAN 112 that has been assigned to users having identifiers 51 and 4, allows lowest bandwidth of 10 MB to users that belong to the respective VLAN. Details of each security policy allocated to a given user can also be seen at any time so that, if desired, the policies can be amended and modified.

Tables 400 and 500 may represent exemplary views presented within a GUI of network controller that can monitor network activity of any user and manually/automatically/semi-automatically compute/update CR scores of users based on such network activity and other user-level parameters to accordingly assign an appropriate VLAN. GUI can also be configured to enable viewing/editing/deletion of any security policy or characteristic/property/setting of a VLAN. Changes in user profiles, preferences, interests, roles and responsibilities, among other parameters can also enable automatic changes to CR scores, based upon which allocation of VLANs can also be changed.

Figure 6:
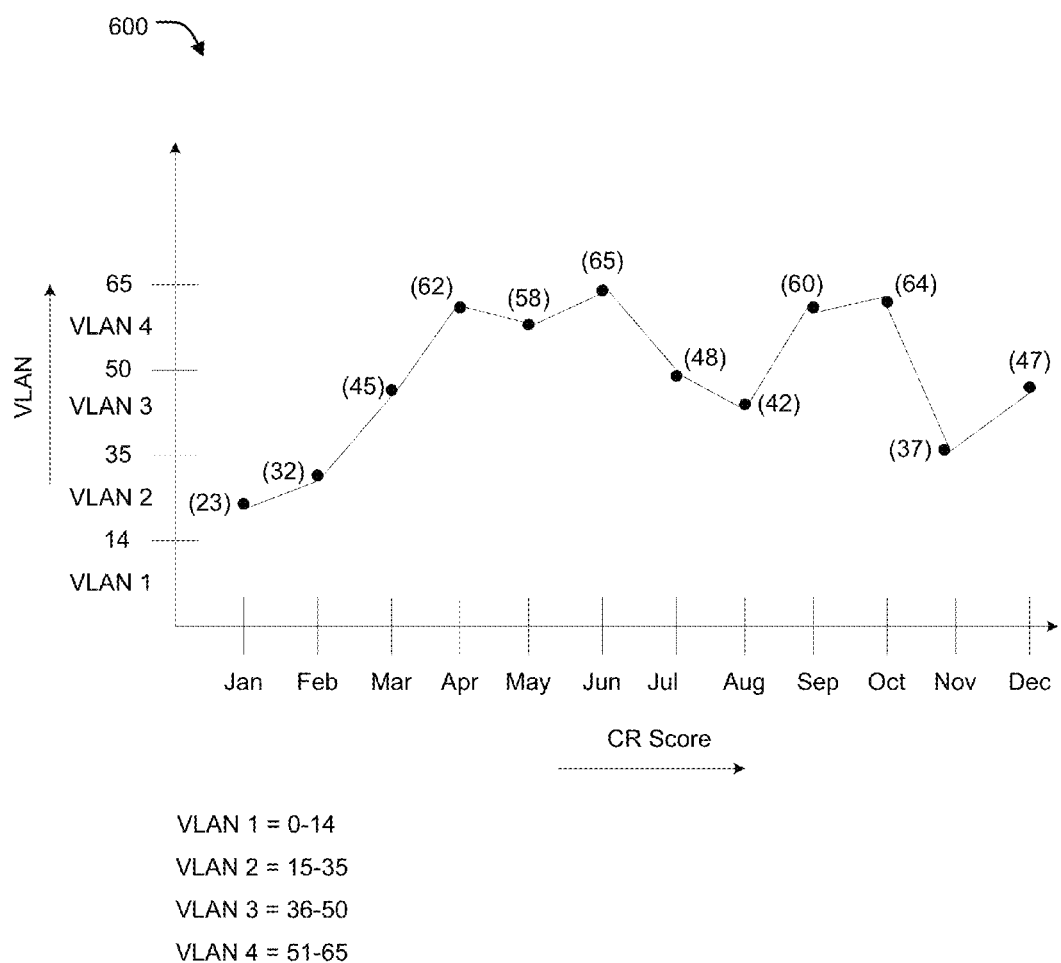
FIG. 6 illustrates change in VLAN assignment based on change in CR score in accordance with an embodiment of the present invention.

FIG. 6 illustrates a graph 600 showing change in VLAN assignment over time based on changes in CR scores in accordance with an embodiment of the present invention. In an implementation, such CR scores can be measured in real-time or periodically such as every month to evaluate the appropriate VLAN to which the user should be assigned. In the context of FIG. 6, it is assumed that CR scores are monitored and evaluated every month, and hence 12 readings have been measured over the course of a twelve-month period. Although, for the purpose of FIG. 6, it has been assumed that VLAN assignment is done based on CR scores, such assignment, as mentioned in the description above, can also be performed based on many other attributes such as, among others, user profile, designation and past history.

As shown in FIG. 6, in the first month of January, the CR score of user in context is 23 and VLAN 2 has been assigned. In February, the CR score increases to 32, which does not change the VLAN assignment, as CR scores say from 15-35 may have the same VLAN and network policy assignment. However in March, due to non-compliance with defined policies, the CR score of the user increases to 45. Based on this, a stricter VLAN policy 3 is dynamically assigned to the user. Similarly, such VLAN assignments can be made and modified based on CR scores and other associated attributes.

Figures 7A, 7B, 7C:
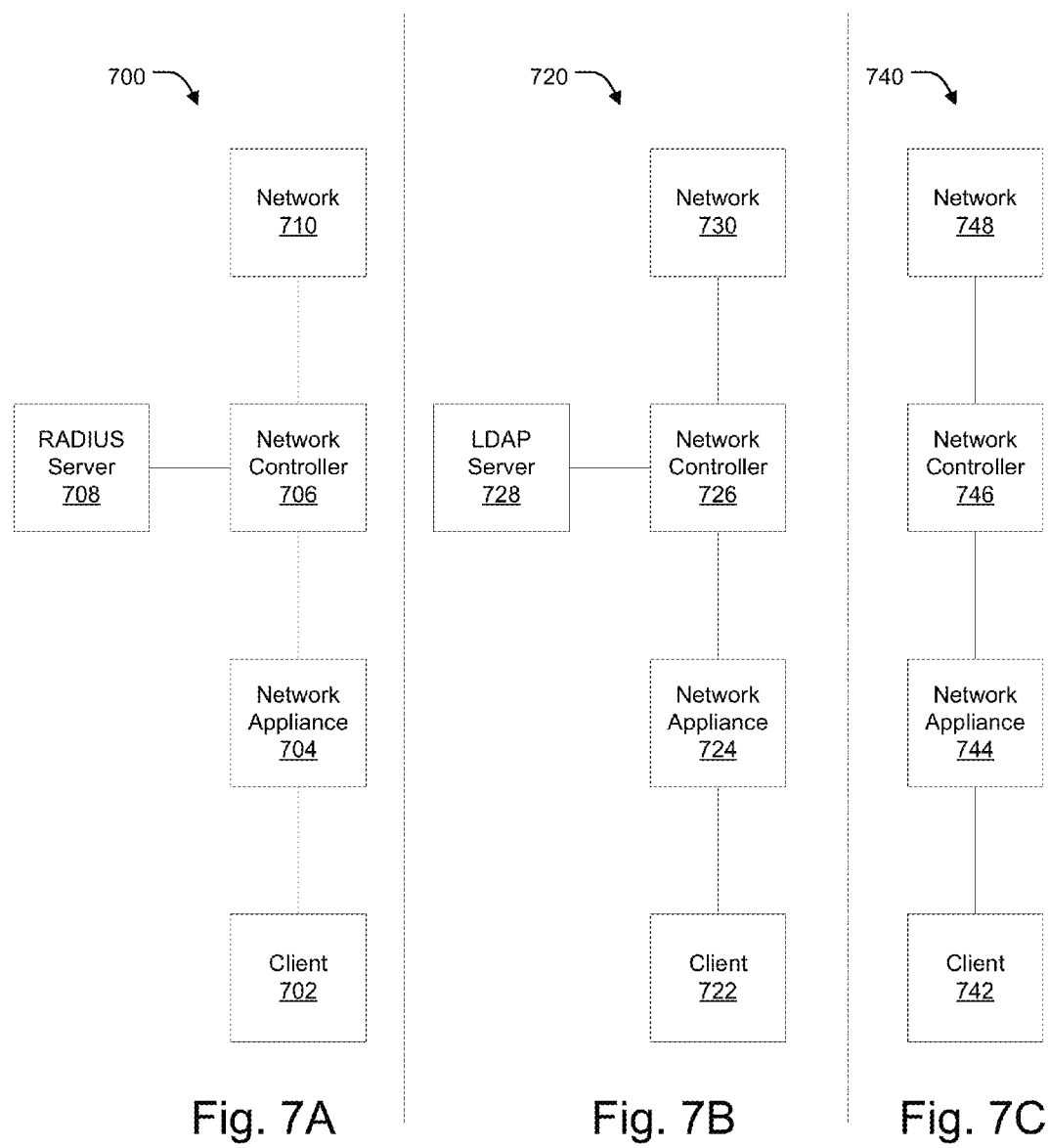
FIGS. 7A-C illustrates various exemplary network architectures for different types of authentication topologies in accordance with embodiments of the present invention.

FIGS. 7A-C illustrate various exemplary network architectures for different types of authentication topologies 700 in accordance with embodiments of the present invention. Authentication can be performed for one or more client devices before being able to access network level resources and make requests therefor. FIG. 7A, for instance, illustrates use of a RADIUS server 708 that is operatively coupled with controller 706 to receive authentication requests from users/clients 702, which can be send through a network appliance 704. Client device 702 can be responsible for passing user information to designated RADIUS server 708, and then act based on the response that is returned from the server 708, wherein the server 708 is responsible for receiving user connection requests, authenticating the user, and then returning all configuration information necessary for the client to deliver service to the user. Transactions between the client 702 and RADIUS server 708 can be authenticated through use of a shared secret, which is never sent over the network. In addition, any user passwords sent between the client 702 and RADIUS server 708 are encrypted in order to eliminate the possibility that someone snooping on an unsecure network could determine a user's password.

FIG. 7B, through representation 720, illustrates use of LDAP server 728 for authenticating user through client devices 722. LDAP server 728 can either be connected with network controller 767 or with the network appliance 724 such that whenever a client 722 sends a request, network authentication check can be done at network controller 726 via the LDAP server 728. In an implementation, based on an authentication request, server 728 can be configured to form a LDAP session through which the LDAP client connects with the server 728 and authentication state of the session is set to anonymous. The BIND/authentication operation establishes the authentication state for a session, based on which the LDAP server 728 can check for authentication such that sooner the authentication is successful, the client can be mapped with a default VLAN or assigned a defined network policy based on authentication and/or user details so as to enable user to access network 730. Any such VLAN assignment may then be informed back to appliance 724 so that requests from client 722 can be routed through the designated VLAN.

In operation, LDAP server 728 can store user information such as user's username, password, type of account, and home directory. Each LDAP server can use this information to determine whether the user is allowed access to the computer, and through the computer, allowed access to a subset of the network. A user authentication request contains specific information about the user and about the LDAP server 728 authenticating the user. User details such as the user's username and password are collected from the user when the user tries to login to the computer. Details about the LDAP server are contained in a configuration file in the operating system. When user authentication request is sent to one or more LDAP servers, the request can be successfully processed by a specific LDAP server only if the request contains the parameters specific to that LDAP server. If the LDAP server's parameters vary even slightly from the information in the user authentication request, then LDAP server 728 may not be able to successfully process the user authentication request and not allow the user to login.

FIG. 7C, through representation 740, illustrates another embodiment using local authentication for validating credentials of user having client device 742. In this embodiment of local authentication, no server may be used, and authentication information can be stored and processed at network controller 746 level whenever the client 742 sends a request through appliance 744 to access network 748. It should be appreciated that any other authentication mechanism such as RSAkcureID, native RSA, Gemalto, among others can be incorporated in the present system, and therefore any combination of such mechanisms are completely within the scope of the present system.

Figure 8:
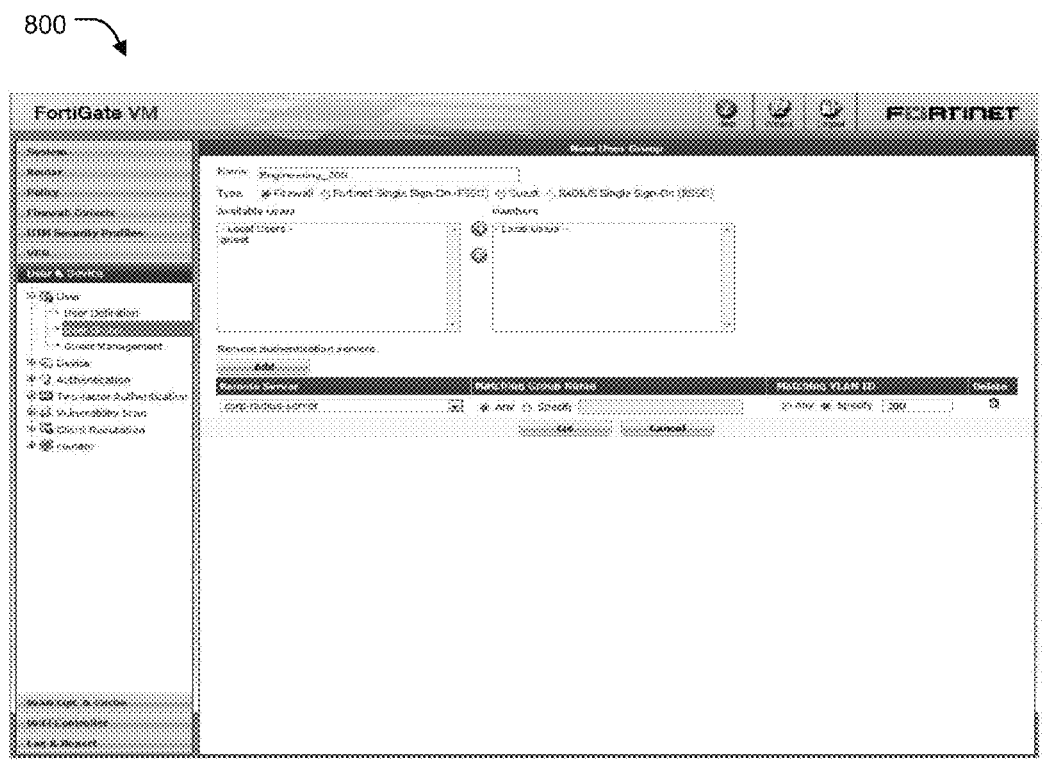
FIG. 8 illustrates an exemplary screenshot showing VLAN group creation on interface of the network controller in accordance with an embodiment of the present invention.

FIG. 8 illustrates an exemplary screenshot 800 showing VLAN group creation within an interface of the network controller in accordance with an embodiment of the present invention. As shown, a given authentication server applicable to a user or group of users can initially be decided based on which authentication can then be performed whenever the user wishes to conduct network level activity. A default or matching VLAN can also be associated with each authentication server such as RADIUS server such that sooner a user or group thereof are authenticated, they can be assigned the default VLAN. Snapshot 800 therefore illustrates creation of user and applicable authentication servers for each user along with indicating the matching VLAN ID that can be associated with the user.

Figure 9:
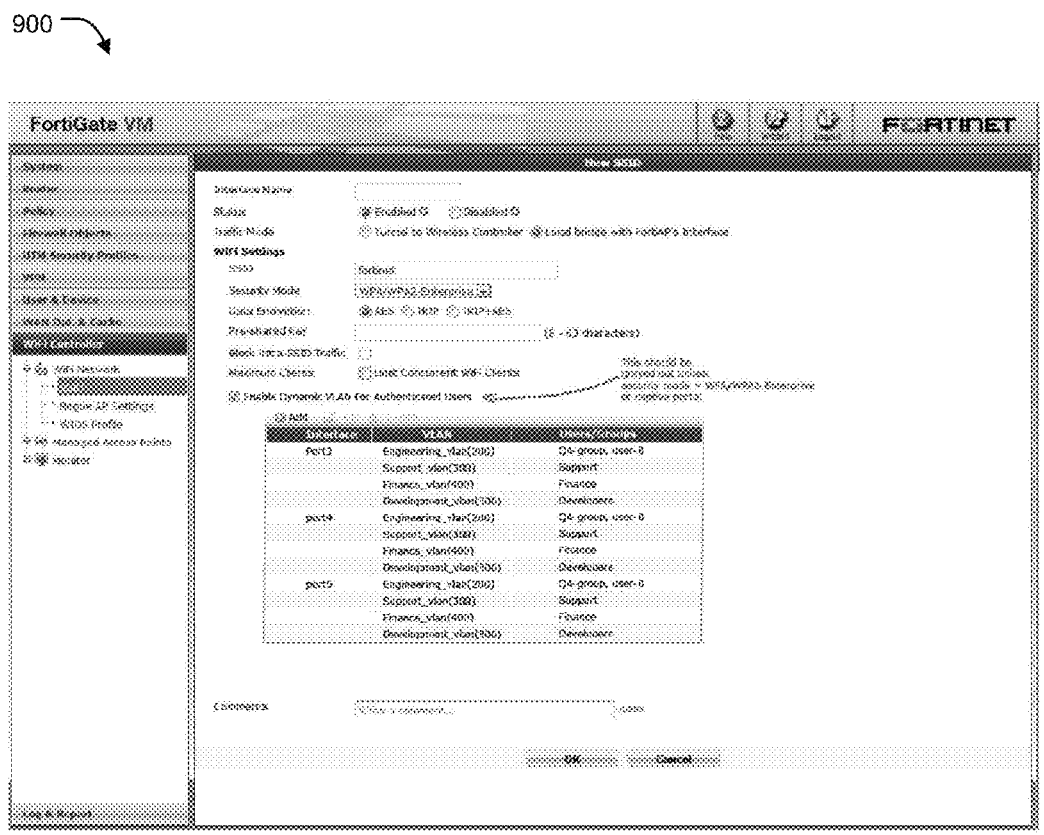
FIG. 9 illustrates an exemplary screenshot showing mapping of SSID of local user groups to configured VLAN in accordance with an embodiment of the present invention.

FIG. 9 illustrates an exemplary screenshot 900 showing mapping of a service set identifier (SSID) of local user groups to configured VLANs in accordance with an embodiment of the present invention. As shown, network name/SSID settings can be configured for wireless network that client devices, of say a LAN, form a part of Each user or groups of users (such as QA-group, user-B, support, finance) can be assigned a VLAN (such as Engineering_vlan 200, Support_vlan 300, and Development_vlan 500) at different or same interface ports (such as Port3, port4, and port5).

Figure 10:
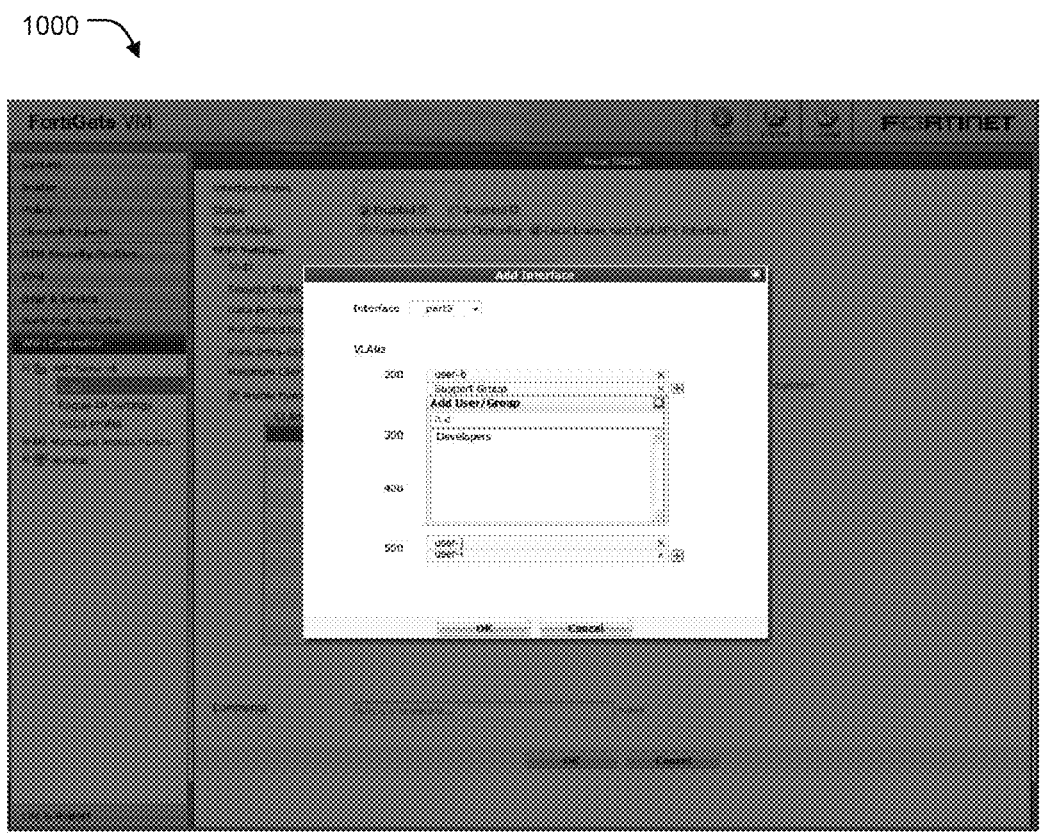
FIG. 10 illustrates an exemplary screenshot showing addition of user/group to VLAN in accordance with an embodiment of the present invention.

FIG. 10 illustrates an exemplary screenshot 1000 showing addition of a user/group to a VLAN in accordance with an embodiment of the present invention. As shown, for a given interface port5, multiple VLANs can be configured and assigned to a plurality of users. For instance, as illustrated, user-b and Support group are assigned to VLAN 200, whereas Developers are assigned to VLAN 300, and similarly, user-i and user-j are assigned to VLAN 500.

Figure 11:
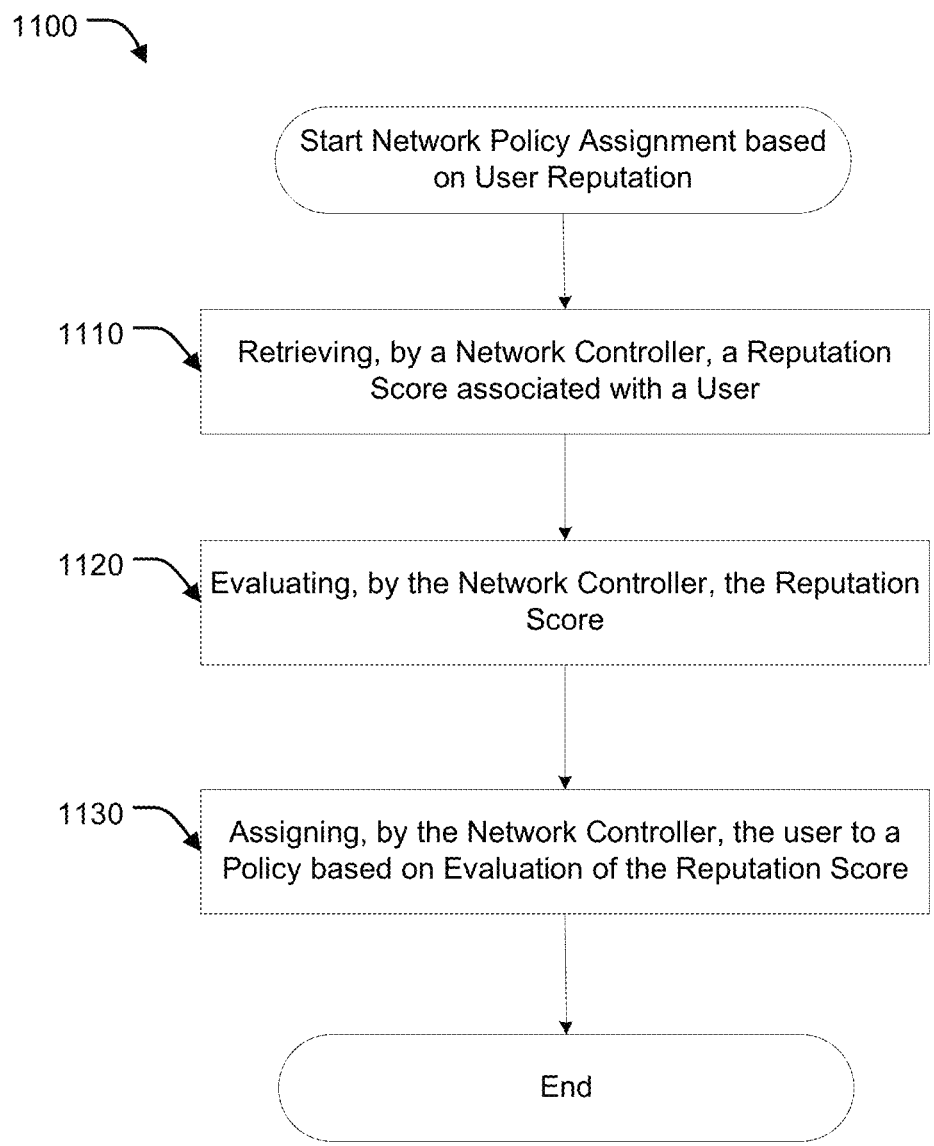
FIG. 11 is a flow diagram illustrating a method for assigning network policies based on client reputation score of a user in accordance with an embodiment of the present invention.

FIG. 11 is a flow diagram 1100 illustrating a method for assigning network policies based on a client reputation score of a user in accordance with an embodiment of the present invention. At step 1110, reputation score, also referred to as CR score, of a user is retrieved by network controller. Along with CR score, other parameters such as user profile, organization policies, user designation, past history, among others can also be retrieved. At step 1120, CR score, along with or without other parameters, can be evaluated based on one or more thresholds to determine a grade or category to which the user belongs based on his/her network level activity. At 1130, based on the grade/category and/or CR score, the controller can be configured to assign a network security policy to the user such that the policy governs the manner in which the user accesses and processes network requests, applications, content, among other activities.

Figure 12:
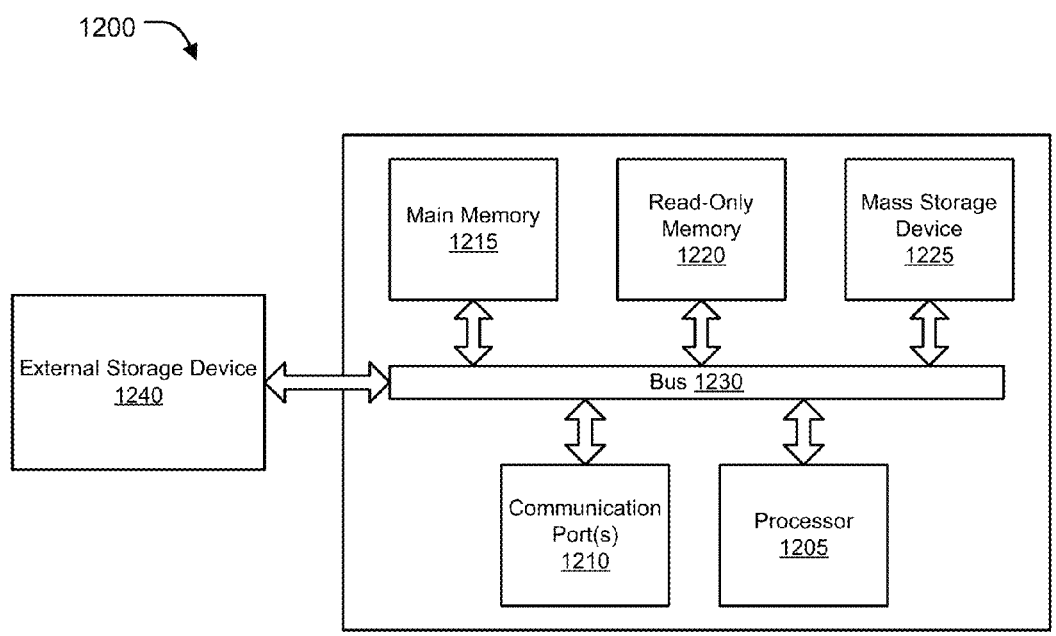
FIG. 12 is an exemplary computer system in which or with which embodiments of the present invention may be utilized.

FIG. 12 is an example of a computer system 1200 with which embodiments of the present disclosure may be utilized. Computer system 1200 may represent or form a part of a network device (e.g., network controller 106, network appliance 104, firewall 108 or other network security gateway or appliance), a server, an administrative console or computer system or a client workstation.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps.

Alternatively, the steps may be performed by a combination of hardware, software, and/or firmware.

As shown, computer system 1200 includes a bus 1230, a processor 1205, communication port 1210, a main memory 1215, a removable storage media 1240, a read only memory 1220 and a mass storage 1225. A person skilled in the art will appreciate that computer system 1200 may include more than one processor and communication ports.

Examples of processor 1205 include, but are not limited to, an Intel® Xeon® or Itanium® processor(s), or AMD® Opteron® or Athlon MP® processor(s), Motorola® lines of processors, FortiSOC™ system on a chip processors or other future processors. Processor 1205 may include various modules associated with network appliance 200 as described with reference to FIG. 2. For example, processor 1205 may include one or more of configuration module 202, buffering module 204, intrusion prevention module 206 and logging module 208.

Communication port 1210 can be any of an RS-232 port for use with a modem based dialup connection, a 10/100 Ethernet port, a Gigabit or 10 Gigabit port using copper or fiber, a serial port, a parallel port, or other existing or future ports. Communication port 1210 may be chosen depending on a network, such a Local Area Network (LAN), Wide Area Network (WAN), or any network to which computer system 1200 connects.

Memory 1215 can be Random Access Memory (RAM), or any other dynamic storage device commonly known in the art. Read only memory 1220 can be any static storage device(s) such as, but not limited to, a Programmable Read Only Memory (PROM) chips for storing static information such as start-up or BIOS instructions for processor 1205.

Mass storage 1225 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1230 communicatively couples processor(s) 1205 with the other memory, storage and communication blocks. Bus 1230 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1205 to system memory.

Optionally, operator and administrative interfaces, such as a display, keyboard, and a cursor control device, may also be coupled to bus 1230 to support direct operator interaction with computer system 1200. Other operator and administrative interfaces can be provided through network connections connected through communication port 1210.

Removable storage media 1240 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method comprising:
maintaining, by a network controller for a protected network having a plurality of users, an association between a plurality of Virtual Local Area Networks (VLANs) into which the protected network is divided and a plurality of security policies;
retrieving, by a network controller, for a user of the plurality of users, a reputation score associated with said user, wherein said reputation score is generated based on activities of said user within the protected network;
evaluating, by said network controller, said reputation score; and
assigning, by said network controller, a security policy of the plurality of security policies to the user by assigning the user to a VLAN of the plurality of VLANs that is associated with the security policy based on evaluation of said reputation score, wherein the security policy governs a manner in which said user is permitted to interact with the protected network.

2. The method of claim 1, wherein the method further comprises the step of authenticating, by said network controller, said user prior to retrieving said reputation score.

3. The method of claim 2, wherein said authentication is performed based on one or more of Remote Authentication Dial-In User Service (RADIUS) based on authentication, Lightweight Directory Access Protocol (LDAP) based authentication, Active Directory, Novell E-directory, Safeword, SecureID, Security Assertion Markup Language 2.0 (SAML2), Terminal Access Controller Access-Control System (TACACS+), and Local Authentication.

4. The method of claim 1, wherein said evaluating comprises comparing said reputation score with one or more threshold values.

5. The method of claim 4, wherein said assigning comprises choosing the VLAN based on said comparison of said reputation score with said one or more threshold values.

6. The method of claim 1, wherein said reputation score is generated based on a plurality of rules on the basis of which said activities of said user are assessed.

7. The method of claim 1, wherein the network controller is operable within a gateway device.

8. The method of claim 1, wherein said reputation score is stored in a database that is operatively coupled with said network controller.

9. The method of claim 1, wherein said security policy comprises one or more of blocking said user, rate limiting access of said user, characterizing acceptable traffic to be sent by or received by said user, and implementing network access conditions on said user.

10. The method of claim 1, wherein said assigning further comprises changing said security policy for said user dynamically based on a change in said reputation score.

11. A network controller device comprising:
one or more processors;
a communication interface through which the network controller device is coupled to a protected network;
one or more internal data storage devices operatively coupled to the one or more processors and storing:
a graphical user interface (GUI) module through which an association between a plurality of Virtual Local Area Networks (VLANs) into which a protected network, monitored by the network controller device and having a plurality of users, is divided and a plurality of security policies is viewed and edited by an administrator of the protected network;
a reputation score retrieval module configured to retrieve, for a user of the plurality of users, a reputation score associated with said user, wherein said reputation score is generated based on activities of said user within the protected network;
a reputation score evaluation module configured to evaluate said reputation score; and
a policy assignment module configured to assign a security policy of the plurality of security policies to said user by assigning the user to a VLAN of the plurality of VLANs that is associated with the security policy based on the evaluation of said reputation score, wherein the policy governs the manner in which said user is permitted to interact with the protected network.

12. The network controller device of claim 11, further comprising an authentication module configured to authenticate said user prior to retrieving said reputation score.

13. The network controller device of claim 12, wherein said authentication is performed based on one or more of Remote Authentication Dial-In User Service (RADIUS) based on authentication, Lightweight Directory Access Protocol (LDAP) based authentication, Active Directory, Novell E-directory, Safeword, SecureID, Security Assertion Markup Language 2.0 (SAML2), Terminal Access Controller Access-Control System (TACACS+), and Local Authentication.

14. The network controller device of claim 11, wherein the reputation score evaluation module is further configured to compare said reputation score with one or more threshold values.

15. The network controller device of claim 14, wherein the policy assignment module is further configured to choose the VLAN based on said comparison of said reputation score with said one or more threshold values.

16. The network controller device of claim 11, wherein the network controller device is operable in a gateway device.

17. The network controller device of claim 11, wherein said reputation score is stored in a database that is operatively coupled with said network controller device.

18. The network controller device of claim 11, wherein said security policy comprises one or more of blocking said user, rate limiting access of said user, characterizing acceptable traffic to be sent and/or received by said user, and implementing network access conditions on said user.

* * * * *